Figure 1:
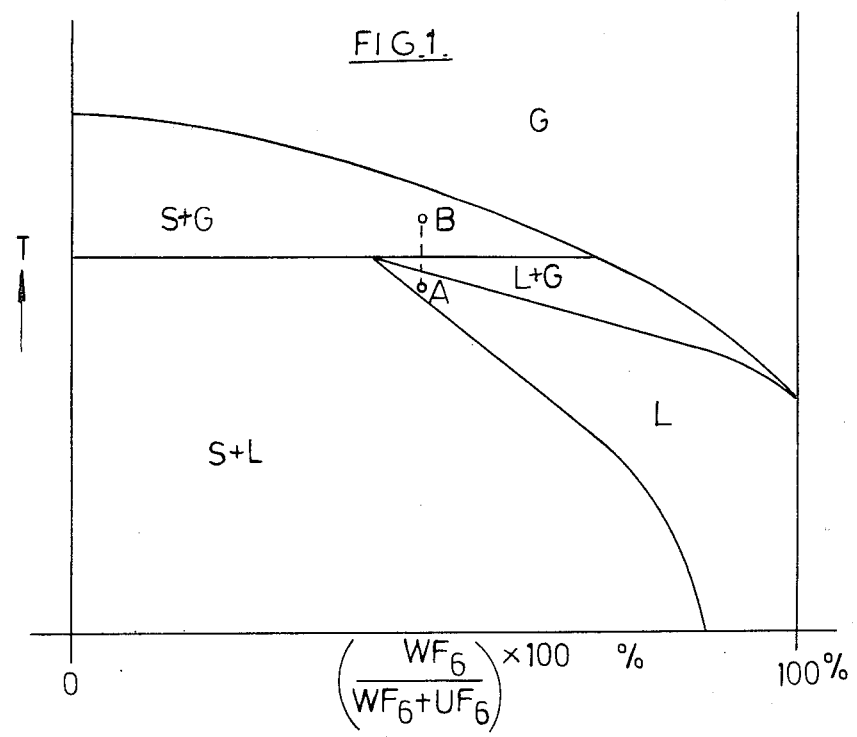

United States Patent
Ward

[11] 3,991,155
[45] Nov. 9, 1976

[54] ISOTOPIC ENRICHMENT OF URANIUM HEXAFLUORIDE IN 235-URANIUM

[76] Inventor: John Clive Ward, 16 Fern St., Pymble, New South Wales, Australia

[22] Filed: Mar. 20, 1974

[21] Appl. No.: 452,843

[30] Foreign Application Priority Data
Mar. 23, 1973 Australia.............................. 2732/73

[52] U.S. Cl. .................................. 423/19; 23/300; 423/258
[51] Int. Cl.² ......................................... C01G 43/06
[58] Field of Search ................. 423/19, 258; 23/300

[56] References Cited
UNITED STATES PATENTS
3,806,579   4/1974   Carles et al. .......................... 423/19

OTHER PUBLICATIONS
Bigeleisen, *J. Inorg. Nucl. Chem.*, 34, pp. 2505–2511 (1972), Pergamon Press.

*Primary Examiner*—Edward A. Miller
*Attorney, Agent, or Firm*—Hill, Gross, Simpson, Van Santen, Steadman, Chiara & Simpson

[57] ABSTRACT

A compound of a chemical element to be isotopically enriched is placed in a working zone with an auxiliary material and temperature and pressure conditions are controlled to cause a liquid solution to occur. The liquid solution is injected through a nozzle into a separating chamber, for example, at substantially constant pressure and with slight elevation of temperature, to cause a phase change, the liquid solution yielding a solid phase which is enriched in respect of an isotope of the chemical element and a gaseous phase which is depleted. The series of such stages are arranged in cascade with the enriched solid phase being passed forward to the following stage for further enrichment and the depleted gaseous phase being passed back to the previous stage for further depletion. The arrangement is especially applicable to uranium enrichment, wherein the compound is uranium hexafluoride and the auxiliary material is tungsten hexafluoride.

7 Claims, 2 Drawing Figures

ISOTOPIC ENRICHMENT OF URANIUM HEXAFLUORIDE IN 235-URANIUM

The present invention relates to isotopic enrichment and one particularly important application is thought to be for enriching uranium. However, the invention extends to enrichment of other elements and is not restricted to this example.

Isotopic enrichment, which is the variation of the natural concentration of the isotopes of a chemical element, is of considerable importance, particularly in the field of atomic energy wherein natural uranium is enriched in respect of the isotope uranium-235 as a step in preparing fuel. It has previously been proposed to effect isotopic enrichment by either gaseous diffusion or ultra-centrifugation.

In the gaseous diffusion process, a gas is applied under high pressure to a porous diffusion barrier having pore sizes of the same order of magnitude as the mean-free path of the molecules of the gas. Molecules of lower atomic mass will diffuse through the barrier faster than those with a higher atomic mass and thus enrichment can occur. However, this process consumes a very large amount of energy and highly sophisticated barrier technology is required for implementing the process. Furthermore, the process has drawbacks in that to be an economic process the installations must be on a very large scale involving very high capital expenditure.

The ultra-centrifugation process comprises subjecting a gas of the isotope concerned to a very high rotational speed, usually in a cylindrical container, whereby the heavier isotopes concentrate close to the container walls under centrifugal force so that separation can be effected. However, a high capital expenditure and stringent engineering standards are necessary for this arrangement.

United Kingdom Pat. No. 1,288,098 discloses isotopic enrichment by causing partial solidification of the compound during reduction of enthalpy. It is also suggested that an auxiliary gas such as helium can be present during this step. However, it is not understood how this disclosure could be operated or how the arrangement could work effectively.

A principle object of the present invention is to provide a new and useful enrichment process in which a low energy input is required so as to provide an economic process. Another object of the invention is to permit the process to operate without high standards of engineering and great expense necessary in constructing the apparatus.

In the present invention, a compound is placed with an auxiliary material in a working zone and the temperature and pressure conditions are controlled to cause a liquid solution of the compound and auxiliary material to yield a solid phase which is isotopically enriched and a gaseous phase which is depleted and comprises the auxiliary material and the compound.

This process can be considered advantageous because latent heat released on conversion of liquid solution to solid phase is available for converting liquid solution to the gaseous phase. Thus only a low heat input may be required.

It is thought that the present process operates by the liquid solution evaporating and the solid phase resulting from condensation of the compound through a gaseous barrier of the auxiliary material, which in effect forms a membrane.

In a preferred embodiment, the liquid solution is formed in a first chamber which is then injected into a second chamber. Preferably, the liquid is injected as droplets preferably in the form of a fine mist so as to facilitate flashing of the liquid solution to provide the solid and gaseous phases.

It is preferable that the auxiliary material should have a high molecular weight, for example as compared with helium, so as to facilitate a useful separation factor resulting for the process. In a preferred embodiment of the invention the auxiliary material is tungsten hexafluoride which is thought to be especially useful when the compound is uranium hexafluoride.

In a preferred and important embodiment of the invention, the conditions are controlled by making a small temperature increase and maintaining substantially constant pressure. However, the conditions might be altered in the process by increasing the pressure and maintaining the temperature at a substantially constant level.

In a commercially useful process for enriching uranium, the enrichment is effected in a cascade of stages in each of which the process according to the invention is effected. The solid phase resulting from one of the stages is advanced to the following stage and the gaseous phase is fed back to the previous stage.

Figure 2:
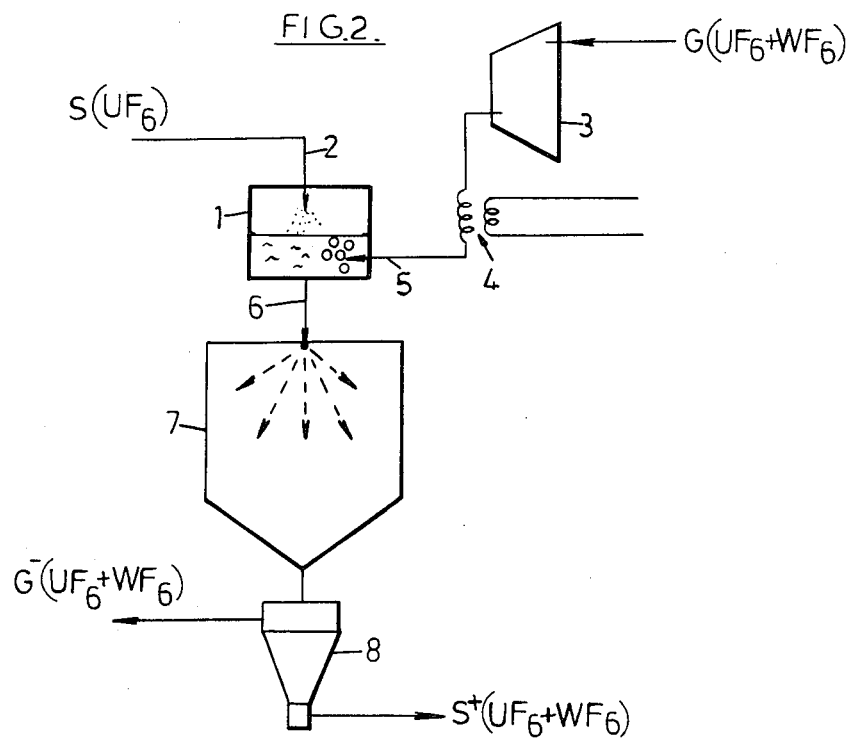

Reference will now be made to the accompanying drawings, wherein:

FIG. 1 is a phase diagram illustrating the temperature dependence of mixtures of uranium hexafluoride and tungsten hexafluoride, the percentage of tungsten hexafluoride increasing from left to right across the diagram; and FIG. 2 is a schematic diagram illustrating one stage in a cascade enrichment process embodying the invention.

Referring first to FIG. 1, the phase diagram for a given pressure shows a complex arrangement whereby the uranium hexafluoride ($UF_6$) and tungsten hexafluoride ($WF_6$) forms a gaseous mixture (G), a liquid solution (L), both liquid and gas solutions co-existing (L+G), solid $UF_6$ co-existing with a gaseous mixture (S+G), or, solid $UF_6$ co-existing with liquid solution (S+L). The process of the present invention can be efficiently worked by a transition typically indicated by the dotted line extending between starting point A and finishing point B, a liquid solution of the $UF_6$ and $WF_6$ at point A passing through a liquid and gaseous phase to a final phase with solid $UF_6$, which is enriched, and depleted gas of $UF_6$ and $WF_6$ occurs at point B.

It is to be noted that the preferred embodiment of the invention indicated by the transition from point A to point B on FIG. 1, represents a phase change at substantially constant pressure. However, the phase diagram is a complicated one and variations in pressure produce substantial changes in the nature of the diagram.

Scientific work has been published in relation to $UF_6$ in conjunction with $WF_6$ and attention is directed to the works mentioned below as providing a background to the phase diagram of FIG. 1.

Experimental data on the solid-liquid boundary line on the phase diagram for $UF_6$-$WF_6$ was published by V. N. Prusakov and V. K. Ezhov, published in Atomnaya Energiya, Volume 25, 64 (1968).

Work on the vapour pressure of $UF_6$ was reported by G. D. Oliver, H. T. Milton and J. W. Grysard, published in the Journal of American Chemical Society, Volume 75, page 2827 (1953), this work being used by J. Reynes, M. Carles and J. Aubert, published in Journal of Chim. Phys., Volume 67, page 1530 (1970), this work concerning the deduction of activity coefficient data in liquid-vapour equilibrium of $UF_6$-$WF_6$.

Referring now to FIG. 2, a first chamber 1 is provided as a combining chamber and receives via a line 2 a supply of solid $UF_6$ which has been enriched by a previous stage, and a supply of gas mixture of $UF_6$ and $WF_6$ which is received from the next following stage of a cascade of which the stage shown in FIG. 2 is an intermediate stage. Gas mixture is supplied through a gas compressor 3, the gas being raised in temperature by a heat-exchanger 4 before the gas is supplied through a line 5 into the combining chamber 1, wherein by appropriate temperature control if necessary, a liquid solution of $WF_6$ and $UF_6$ is established. The liquid solution is supplied by a line 6 to a nozzle through which the solution is forced to provide a very fine spray which is dispersed within a separating chamber 7, the liquid solution being sprayed in a superheated form through the nozzle.

Flashing of the liquid solution occurs in the separating chamber 7 to yield a solid enriched phase and a depleted gaseous phase which pass to a separator 8 having two outputs, one output of the separator is provided for passing the depleted gaseous phase back to the previous stage of the cascade and the other output is provided forwarding the enriched solid phase to the next following stage.

It is thought that this process follows a path between points A and B on the diagram of FIG. 1, the latent heat of sublimation released from the condensing $UF_6$ almost entirely supplying the latent heat of evaporation for vaporizing the liquid droplets. It will be appreciated that enrichment of the solid $UF_6$ in respect of the lighter isotope uranium-235 occurs because the molecules of $UF_6$ condensing on solid in the separating chamber must first diffuse from a liquid droplet through the intermediate gas which includes $WF_6$ and therefore enrichment occurs due to intergaseous diffusion.

It is thought that the ratio of the diffusion coefficients of $^{235}UF_6$ and $^{238}UF_6$ in a gas mixture with an auxiliary material of molecular weight M present is given by the following formula:

$$1 + 0.0043/(1 + 352/M.$$

Thus, if for example helium was chosen as the auxiliary material then it is thought that the ratio diffusion coefficients and thus, the degree of enrichment would be so small as to be not an economic proposition whereas if $WF_6$ is used, having a molecular weight of 298, the ratio resolves to the value 1.0021. It is considered that this is large enough for an economic process to be established.

Furthermore, it is suggested that enrichment may occur as a result of intergaseous diffusion during evaporation in addition to the enrichment occurring during condensation. Additionally, it may be that during crystallization of the solid $UF_6$, there may be some isotopic enrichment over and above the other forms of enrichment which, as suggested above, may occur.

It is to be understood that the foregoing explanation of the embodiment of the invention is given tentatively and without guarantee that it is correct since the state of present knowledge does not permit the applicant to be certain of the mechanism involved.

I claim:

1. A process for isotopically enriching uranium hexafluoride in respect of the uranium-235 isotope comprising, placing an amount of uranium hexafluoride and an amount of a selected auxiliary material in selected proportions in a working zone, the selected auxiliary material having a high molecular weight compared with helium and capable of forming a liquid solution with the uranium hexafluoride under the operating conditions of the process, applying a particular condition of temperature and pressure to form a liquid solution of the uranium hexafluoride and said auxiliary material, altering said particular condition to cause a solid phase and a gaseous phase to be yielded, the solid phase being enriched in respect of the uranium-235 isotope and the gaseous phase being depleted in respect of said isotope, and separating said solid and gaseous phases.

2. A process as claimed in claim 1, wherein said liquid solution is formed in a first chamber and then the liquid solution is injected in the form of fine droplets into a second chamber whereby said particular condition is altered to yield said solid and gaseous phases.

3. A process according to claim 1, wherein the auxiliary material is tungsten hexafluoride.

4. A process according to claim 1, wherein said alteration of said particular condition is effected by heating at substantially constant pressure.

5. A process according to claim 1, wherein said alteration of said particular condition is effected by an increase in pressure.

6. An isotopic enrichment process comprising a cascade of steps, each of which comprises the process defined in claim 1, the solid phase resulting from the process of claim 1 being advanced to the next step in the cascade and the gaseous phase being routed to the previous stage in the cascade.

7. A process for isotopically enriching uranium hexafluoride in respect of the uranium-235 isotope comprising:

forming a liquid solution of uranium hexafluoride and tungsten hexafluoride under a selected condition of temperature and pressure, altering said selected condition of temperature and pressure to cause said liquid solution to undergo a phase change to yield a solid phase and a gaseous phase, the solid phase being enriched in respect of the uranium-235 isotope and the gaseous phase being depleted in respect of said isotope, and separating said solid and gaseous phases.

* * * * *